US012623943B2

(12) United States Patent
Hansen et al.

(10) Patent No.: US 12,623,943 B2
(45) Date of Patent: May 12, 2026

(54) METHOD OF PREPARING A MELT FOR THE PRODUCTION OF MAN-MADE MINERAL FIBRES

(71) Applicant: ROCKWOOL A/S, Hedehusene (DK)

(72) Inventors: Lars Elmekilde Hansen, Hedehusene (DK); Haosheng Zhou, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 341 days.

(21) Appl. No.: 18/253,290

(22) PCT Filed: Nov. 19, 2021

(86) PCT No.: PCT/EP2021/082247
§ 371 (c)(1),
(2) Date: May 17, 2023

(87) PCT Pub. No.: WO2022/106592
PCT Pub. Date: May 27, 2022

(65) Prior Publication Data
US 2024/0018028 A1 Jan. 18, 2024

(30) Foreign Application Priority Data
Nov. 19, 2020 (EP) ..................................... 20208659

(51) Int. Cl.
*C03B 5/235* (2006.01)
*C03B 5/12* (2006.01)
(Continued)

(52) U.S. Cl.
CPC .............. *C03B 5/2353* (2013.01); *C03B 5/12* (2013.01); *C03B 37/04* (2013.01); *C03C 13/06* (2013.01); *C03B 2211/30* (2013.01)

(58) Field of Classification Search
CPC ................................... C03B 5/12; C03C 13/06
See application file for complete search history.

(56) References Cited

U.S. PATENT DOCUMENTS

| | | | |
|---|---|---|---|
| 4,797,142 A | 1/1989 | Jensen | |
| 5,046,144 A | 9/1991 | Jensen | |
| (Continued) | | | |

FOREIGN PATENT DOCUMENTS

| | | |
|---|---|---|
| EP | 1431403 | 6/2004 |
| WO | 87/06926 | 11/1987 |
| (Continued) | | |

OTHER PUBLICATIONS

International Search Report and Written Opinion, International Application No. PCT/EP2021/082247, mail date Apr. 25, 2022, 13 pages.

*Primary Examiner* — Erin Snelting
(74) *Attorney, Agent, or Firm* — SALIWANCHIK, LLOYD & EISENSCHENK

(57) ABSTRACT
The invention relates to a method of preparing a mineral melt in a cupola furnace that uses at least one plasma torch to provide heat energy to the furnace. The plasma torch uses nitrogen, carbon monoxide, carbon dioxide, or a mixture thereof as the carrier gas. The invention also relates to a cupola furnace for the preparation of the mineral melt, and the use of a plasma torch in a cupola furnace to reduce the amount of $NO_x$ and/or hydrogen in the furnace off-gas.

18 Claims, 1 Drawing Sheet

(51) Int. Cl.
  C03B 37/04          (2006.01)
  C03C 13/06          (2006.01)

(56)                    References Cited

U.S. PATENT DOCUMENTS

| | | | | |
|---|---|---|---|---|
| 6,698,245 | B1 * | 3/2004 | Christensen | ............ C03C 1/026 |
| | | | | 65/121 |
| 2013/0199245 | A1 * | 8/2013 | Bollund | .................... C03B 5/16 |
| | | | | 65/347 |
| 2014/0228195 | A1 | 8/2014 | Solvang et al. | |
| 2014/0311184 | A1 * | 10/2014 | Hansen | .................. C03B 3/026 |
| | | | | 65/28 |

FOREIGN PATENT DOCUMENTS

| | | |
|---|---|---|
| WO | 95/34514 | 12/1995 |
| WO | 99/28252 | 6/1999 |
| WO | 02/070412 | 9/2002 |
| WO | 2012/140173 | 10/2012 |
| WO | 2015/055758 | 4/2015 |

* cited by examiner

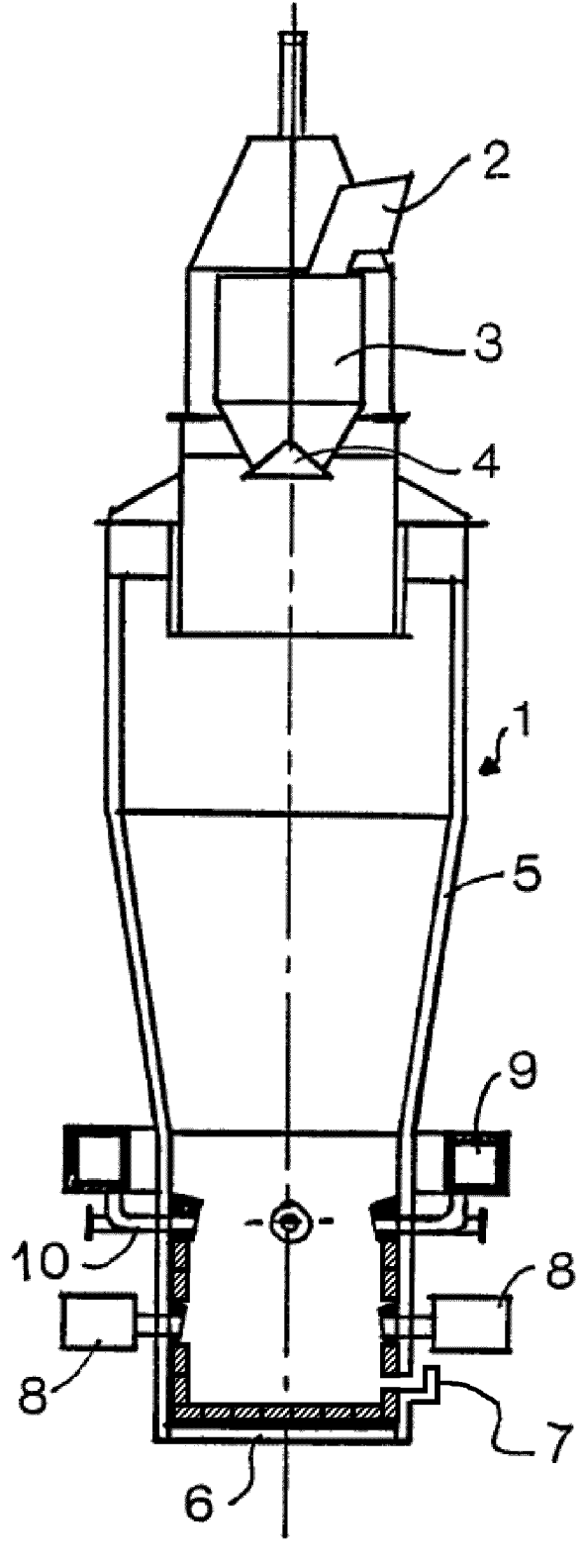

METHOD OF PREPARING A MELT FOR THE PRODUCTION OF MAN-MADE MINERAL FIBRES

CROSS-REFERENCE TO RELATED APPLICATIONS

This application is a national stage application of International Patent Application No. PCT/EP2021/082247, filed Nov. 19, 2021, which claims priority to European Application No. 20208659.1, filed Nov. 19, 2020, the disclosures of each of which are incorporated herein by reference in their entirety, including any figures, tables, and drawings.

FIELD OF INVENTION

The invention relates to a method of preparing a mineral melt in a cupola furnace that uses at least one plasma torch to provide heat energy to the furnace. The plasma torch uses nitrogen, carbon monoxide, carbon dioxide, or a mixture thereof as the carrier gas.

BACKGROUND

Methods of preparing a mineral melt for the production of man-made mineral fibres (MMVF) are known to be carried out in shaft furnaces, such as cupola furnaces. They involve heating mineral material in the presence of coke and an oxygen-containing gas to form the mineral melt. It is challenging to produce mineral melts in a process that reduces harmful emissions in the off-gas of a cupola furnace.

Cupola furnaces typically comprise a range of temperature zones, including a hot zone, an oxidation zone, a reduction zone, and a preheating zone.

The lower portion of the cupola furnace constitutes the hot zone. The hot zone comprises the mineral melt formed in the cupola, which mineral melt is located in the space between the pieces of coke which are resting on the bottom of the cupola and which support the material laying above. In typical cupola furnaces, the melt temperature in the hot zone is in the range of 1450° C. to 1550° C., and it takes a relatively long time to change the temperature of a mineral melt at this location. Further, the distance between the top and bottom of the hot zone is relatively large. This is needed to ensure that the correct oxidation zone temperature is maintained in traditional cupola furnaces.

The oxidation zone (also known as the combustion zone) is located above the hot zone. The lower portion of the oxidation zone is usually provided with gas inlet nozzles, known as tuyeres, through which preheated air or another oxidation gas is introduced into the furnace. Heating is usually generated by combustion of coke. The combustion of the coke takes place during the movement of the preheated air up through the oxidation zone, and the gas temperature may rise from about 500° C. to about 2,000° C., thus causing raw material that moves down through the oxidation zone to be heated to its melting point. This melted mineral material flows down into the hot zone at the base of the cupola furnace. The vertical extension of the oxidation zone is determined by the amount of oxygen introduced into the furnace.

The reduction zone is above the oxidation zone, and starts at the level where the oxygen introduced through the tuyeres is consumed by combustion of the coke. In the reduction zone, where the temperature is typically between 1,000° C. and 1,500° C., coke reacts with the CO 2 formed in the oxidation zone to form CO in an amount which is double the amount of consumed CO 2 based on volume.

This reaction is endothermic causing about 20-25% of the energy released by the combustion in the oxidation zone to be lost as latent heat in the off-gas. As is typical, the off-gas may be used to heat the raw materials due to be melted in the cupola furnace in the preheating zone. The preheating zone is above the reduction zone.

WO 87/06926 relates to a process of producing a mineral melt, in which some of the heating can be provided by use of a plasma torch. In the method, CO in the off-gas is reduced. This may be achieved by using coke to provide at least two thirds of the furnace heating energy. The remainder may be provided by a plasma torch amongst other methods. There is no distinction made between the carrier gases suitable for use with the plasma torch.

Whilst there are advantages to the use of a plasma torch to provide some of the heat energy to the furnace, we find that when plasma torches that use air as the carrier gas are used to form mineral melts, off-gases are formed that comprise a relatively high amount of $NO_x$, such as up to 7,000 to 10,000 ppm. $NO_x$ is deleterious to both the environment and animals, including humans. This is normally mitigated by adding a reducing agent, such as hydro-carbon gases. Off-gas from such cupola furnaces may still contain over 3,100 ppm of $NO_x$, which is many times higher than many national limits. Accordingly, it would be necessary to provide clean-up systems to minimise release of $NO_x$ into the atmosphere. Further, hydrogen may account for up to 20% of the off-gas produced by cupola furnaces heated by plasma torches that use air as the carrier gas. This would present an explosion risk to the furnace.

It is desirable to provide a method for the production of a mineral melt suitable for use in the formation of MMV fibres, such as glass fibre or stone fibre, which process minimises the amount of $NO_x$ and $H_2$ produced in the off-gas of a cupola furnace even when a plasma torch is used. It is also desirable to minimise coke usage in such processes. It is also desirable to reduce the distance between the bottom and top of the hot zone, not least to provide more compact furnace shafts. Further, it may be beneficial to minimise the time taken to change the temperature of the mineral melt.

Such advantages may be achieved by providing greater than 50% of the heating energy to the cupola furnace using a plasma torch, wherein the plasma torch uses nitrogen ($N_2$), carbon monoxide (CO), carbon dioxide ($CO_2$), or a mixture thereof as the carrier gas, and water is excluded from any zone of the cupola furnace that is above 750° C.

FIGURES

FIG. 1 shows a schematic representation of a cupola furnace configuration that may be used to implement the invention.

SUMMARY

In a first aspect of the invention, there is provided a process for preparing a mineral melt in a cupola furnace, wherein the cupola furnace comprises at least two temperature zones, including a hot zone at the base of the furnace and an oxidation zone above the hot zone,
- (i) the furnace is equipped with at least one tuyere providing a source of oxygen in the oxidation zone;
- (ii) the furnace comprises at least one plasma torch that uses nitrogen, carbon monoxide, carbon dioxide, or a mixture thereof, as the carrier gas, and provides plasma heating in the hot zone;

(iii) greater than 50% of the furnace heating energy is provided by the plasma torch;

(iv) the temperature in the oxidation zone is below 1,400° C., (v) the temperature in the hot zone is greater than the temperature in the oxidation zone;

(vi) water is substantially excluded from any zone of the furnace where the temperature is above 750° C., and wherein mineral material is supplied to the furnace and is melted to form the mineral melt that collects in the base of the furnace, and wherein the process produces off-gas.

Plasma torches generate thermal plasma using direct current (DC), alternating current (AC), radio-frequency (RF) and other discharges. Thermal plasmas provide heat, which in DC plasma torches is produced by sending an electric arc between two electrodes, through which arc a carrier gas is passed within a constricted opening. This elevates the temperature of the gas to the point that it enters a fourth state of matter, i.e. plasma. Plasma torches may be transferred or non-transferred. In non-transferred DC plasma torches, the electrodes are inside the housing of the torch. Whereas in a transferred plasma torch one electrode is located outside the housing of the torch, allowing the arc to form outside of the plasma torch and over a greater distance. It is preferable that the plasma torch in the present invention is a non-transferred plasma torch. Most preferably it is a direct current non-transferred plasma torch.

Plasma torches may use a variety of carrier gases, such as oxygen, nitrogen, argon, helium, air, hydrogen or mixtures thereof. In the present invention, the carrier gas is selected from the group consisting of nitrogen, carbon monoxide, carbon dioxide, and mixtures thereof. Preferably, the carrier gas is nitrogen. It has been found that the production of $NO_x$ may be significantly reduced when oxygen is excluded from zones of a cupola furnace that comprise nitrogen and are at a temperature of 1,400° C. or above. To help minimise the production of $NO_x$, the carrier gas, at most, should comprise only a trace amount of oxygen. This means that the carrier gas should comprise less than 5 weight % of oxygen, such as less than 2 weight %, preferably less than 0.8 weight %, based upon the total weight of the carrier gas. Ideally, the carrier gas is devoid of oxygen. This means that there are, at most, only trace amounts of oxygen present.

The enthalpy of the carrier gas used in the plasma torch is preferably from 2.0 to 6.0 $kWh/Nm^3$, preferable from 3.0 to 5.0 $kWh/Nm^3$.

The enthalpy is calculated as measured power divided by measured carrier gas flow. The enthalpy is relevant for controlling melt temperature and melt capacity.

A cupola furnace useful in the process of the invention may comprise one plasma torch. Alternatively, it may comprise multiple plasma torches, such as two, three, four or more plasma torches. The power of each plasma torch is typically in the region of from 1 to 6 MW.

As used herein, and unless otherwise stated, the terms "oxygen", "nitrogen", "carbon monoxide", "carbon dioxide" and "hydrogen" refer to $O_2$, $N_2$, CO, $CO_2$, and $H_2$, respectively. The term "$NO_x$" is known in the art, and includes nitrogen oxides, such as nitric oxide (NO) and nitrogen dioxide ($NO_2$).

Notwithstanding the benefits of using a plasma torch to provide thermal energy to a cupola furnace, heat energy may also be provided via alternative means. According to the present invention, greater than 50% of the furnace heating energy is provided by the plasma torch. It may be preferable for a greater amount of the furnace heating to be provided by the plasma torch, such as greater than 60%, preferably greater than 70%, more preferably greater than 80%, most preferably greater than 90%. The remainder of the heat energy may be provided, for instance, in the traditional way, i.e. by burning fuel, such as natural gas or coke, in air provided by tuyeres. The tuyeres are typically located at the bottom of the oxidation zone. The cupola furnace may comprise one tuyere, or multiple tuyeres, such as two, three, four, five, six, seven, eight, nine, ten, eleven, twelve, thirteen, fourteen, fifteen, or more tuyeres. It is preferable that there are from nine to thirteen tuyeres, most preferably eleven tuyeres. In this case, it is preferable that the tuyeres are equally distributed around the periphery of the furnace, except at the location of the siphon (melt outlet). In any case, it is preferable that no tuyeres are located in the same zone as the plasma torch, i.e. there are no tuyeres in the hot zone. This helps to avoid oxygen being present in a zone of the cupola furnace that is above 1,400° C. It is preferable that heating is provided in the hot zone solely by the plasma torch.

The tuyeres may provide air at a rate of 70 to 250 $Nm^3$ air per ton charge. The aperture of each tuyere through which air flows into the cupola furnace is typically located from 0 up to a maximum of 1 furnace diameter above the plasma torches. The furnace diameter is the internal diameter of the inner chamber of the cupola furnace.

As $NO_x$ may be derived from nitrogen and oxygen under high temperature and pressure, the temperature in the oxidation zone of the cupola furnace should be below 1,400° C. To reduce $NO_x$ further, it is preferable that the temperature of the oxidation zone is below 1,300° C., preferably below 1,200° C., more preferably below 1,100° C., even more preferably below a 1,000° C., especially below 900° C., particularly below 800° C. In any case, the temperature of the hot zone should be greater than the temperature of the oxidation zone. This means that the temperature in the hot zone may be above 800° C., preferably above 900° C., more preferably above 1,000° C., more preferably above 1,100° C., more preferably above 1,200° C., more preferably above 1,300° C., more preferably above 1,400° C.

Based upon the above, the process of the invention may lead to off-gas comprising $NO_x$ in an amount of less than 400 ppm, preferably less than 300 ppm, more preferably less than 250 ppm, even more preferably less than 200 ppm, more preferably less than 150 ppm.

A further unexpected benefit of heating the hot zone with a plasma torch using carrier gas that is nitrogen, carbon monoxide, carbon dioxide, or a mixture thereof, is that it may significantly reduce the height of the hot zone in comparison to a corresponding cupola furnace that is heated by means other than a plasma torch.

The use of a plasma torch has yet an additional advantage in that it significantly reduces the response time needed to change the temperature in certain zones of the cupola furnace, and in particular the temperature of the mineral melt. Typically, the mineral melt temperature may be changed within 20 minutes, preferably within 15 minutes, more preferably within 10 minutes when using a plasma torch. This may be a faster temperature change than when other heating means are used.

It has been found that water should be excluded from any zone in the furnace that is at a temperature of above 750° C. This minimises the amount of hydrogen that is formed and is present in the off-gas of the cupola furnace. It is preferable that the furnace produces off-gas comprising hydrogen in an amount of less than 20,000 ppm, preferably less than 10,000 ppm, preferably less than ppm, preferably less than 2,000 ppm, preferably less than 1,000 ppm, preferably less than 500 ppm, preferably less than 100 ppm, preferably less than 50 ppm. It is most preferable that there is no detectable amount of hydrogen in the off-gas.

Due to the use of a plasma torch, the amount of coke used in the cupola furnace may be significantly reduced. For instance, the amount of coke used may be less than 80% used in an equivalent cupola furnace that does not use a plasma torch. Preferably, the amount of coke used is less than 70%, such as less than 60%, for instance less than 40%, more preferably less than 20%, most preferably less than 10% of that used in an equivalent cupola furnace that does not use a plasma torch. This has the advantage of reducing emissions in the off-gas, for instance, producing less CO and/or $CO_2$ in the off-gas The off-gas from cupola furnaces that are heated using plasma torches may comprise $N_2$, CO, $CO_2$, $NO_x$ and $H_2$, each of which is a component of the off-gas. The off-gas may comprise additional components, such as water and particles, i.e. solid particles of matter. In a particular feature of the first aspect of the invention, the off-gas as a whole, or in part, may be used in the carrier gas for one or more of the plasma torches. The components of the off-gas may be separated prior to their use as carrier gas. The components of the off-gas may be separated from each other, or the combination of two of more components may be separated from the others components. This means that the carrier gas may comprise at least one component of the off-gas, such as one, two, three, four, five, or more components of the off-gas. It is preferable that the carrier gas comprises the off-gas components $N_2$, CO, $CO_2$ or a combination thereof. Alternatively, the carrier gas may comprise one off-gas component, such as $N_2$, CO, or $CO_2$.

The one or more component of the off-gas may undergo off-gas cleaning prior to its use in the carrier gas. It is preferable that the off-gas cleaning is to remove particles suspended in the off-gas and/or water. The off-gas cleaning may be carried out on the off-gas as a whole, or at least one component thereof once separated from the remainder of the off-gas.

The carrier gas may consist of the off-gas, or at least one component of the off-gas. Alternatively, it may comprise the off-gas, or at least one component of the off-gas. In the latter case, additional gas that did not form part of the off-gas may be added to the carrier gas prior to its use. In this case, the carrier gas is "topped up" with additional gas. The mineral melt prepared via the process of the invention may be suitable for the production of man-made vitreous fibres, such as glass fibres or stone fibres. It is preferable that the mineral melt formed is suitable for use to form man-made vitreous fibres (MMVF). Therefore, in the second aspect of the invention there is provided a process for manufacturing MMVF comprising the steps of (i) forming a melt using a process as defined herein;
(ii) fiberizing the melt by means of an internal or external spinning process; and
(iii) collecting the formed fibres.

The fibres, particular MMVF, may be made from the mineral melt in a conventional manner. Generally, they are made by a centrifugal fibre-forming process. For instance, the fibres may be formed by a spinning cup process in which they are thrown outwardly through perforations in a spinning cup, or mineral melt may be thrown off a rotating disc and fibre formation may be promoted by blasting jets of gas through the mineral melt. Fibre formation may be conducted by pouring the mineral melt onto the first rotor in a cascade spinner. In this case, it is preferable that the mineral melt is poured onto the first of a set of two, three or four rotors, each of which rotates about a substantially horizontal axis whereby mineral melt on the first rotor is primarily thrown onto the second (lower) rotor although some may be thrown off the first rotor as fibres, and mineral melt on the second rotor is thrown off as fibres although some may be thrown towards the third (lower) rotor, and so forth.

It is preferable that the spinning process uses a cascade spinner.

The properties required of a mineral melt to be used in each spinning method are known to those in the art, and the composition of the mineral melt may be tuned to provide those properties. For instance, those skilled in the art are able to select raw materials to be added to the cupola furnace to produce a specific mineral melt composition.

The melt is thus formed into a cloud of fibres entrained in air and the fibres are collected as a web on a conveyor and carried away from the fiberizing apparatus. The web of fibres is then consolidated, which can involve cross-lapping and/or longitudinal compression and/or vertical compression and/or winding around a mandrel to produce a cylindrical product for pipe insulation. Other consolidation processes may also be performed.

A binder composition is conventionally applied to the fibres, preferably when they are a cloud entrained in air. Alternatively it can be applied after collection on the conveyor but this is less preferred. Conventional types of binder for use with mineral wool fibres may be used.

After consolidation the consolidated web of fibres is passed into a curing device to cure the binder.

The curing may be carried out at temperatures from 100 to 300° C., such as 170 to 270° C., such as 180 to 250° C., such as 190 to 230° C.

It is preferred that the curing takes place in a conventional curing oven for mineral wool production wherein hot air is blown through the consolidated web, preferably operating at a temperature of from 150 to 300° C., such as 170 to 270° C., such as 180 to 250° C., such as 190 to 230° C.

The curing may take place for a time of 30 seconds to 20 minutes, such as 1 to minutes, such as 2 to 10 minutes.

Typical the curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state. The cured binder composition binds the fibres to form a structurally coherent matrix of fibres.

The curing of the binder in contact with the mineral fibres may alternatively take place in a heat press. The curing of a binder in contact with the mineral fibres in a heat press has the particular advantage that it enables the production of high-density products.

In general, the fibres, and the mineral melt from which they are formed, may have an analysis (measured as % by weight of oxides) of elements within the various ranges defined by the following normal and preferred lower and upper limits.

| $SiO_2$ | 35-50, preferably 38-48, more preferably 33-44 |
| $Al_2O_3$ | 12-30, preferably 15-28, more preferably 16-24 |

-continued

| | |
|---|---|
| TiO$_2$ | up to 2 |
| Fe$_2$O$_3$ | 2-12 |
| CaO | 5-30, preferably 5-18 |
| MgO | 0-15, preferably 1-8 |
| Na$_2$O | 0-15 |
| K$_2$O | 0-15 |
| P$_2$O$_5$ | 0-3 |
| MnO | 0-3 |
| B$_2$O$_3$ | 0-3. |

It is preferable in this case that, when the melt is to be formed into MMVF, the proportion of Fe(2+) in the mineral melt is greater than 80% based on total Fe, preferably at least 90%, more preferably at least 95% and most preferably at least 97% based on total Fe. In such cases, it is preferable that MMVF is made using a cascade spinner. Further details of these example mineral melts may be found in WO 2012/140173 (which is incorporated herein by reference).

As is conventional in the art, reference herein to FeO in a mineral melt or fibre composition refers to the total amount of iron (calculated in terms of FeO) in said melt or composition irrespective of the amount of each oxidation state of the iron present in the composition.

In the above example of the mineral melt, and the resulting fibres, it is preferred that the amount of iron in the mineral melt is from 2 to 15% by weight, preferably 5 to 12% by weight. Cupola furnaces tend to have a reducing atmosphere, which can result in reduction of iron oxides and formation of metallic iron. Preferably, metallic iron is not incorporated into the mineral melt and fibres and should be removed from the furnace. Thus, the conditions in the furnace may be carefully controlled to avoid excess reduction of iron. However, we find that it is possible to produce final product fibres having significant levels of iron oxide.

The process of the invention may be used in the formation of fibres that can be shown to be soluble in physiological saline. Suitable high aluminium, biologically soluble fibres that can advantageously be made using the process of the present invention are described in WO96/14454 and WO96/14274, and others are described in WO97/29057, DE-U-2970027 and WO97/30002 (which are incorporated herein by reference).

Such fibres preferably have an adequate solubility in lung fluids as shown in vivo tests or in vitro tests, typically conducted in physiological saline buffered to about pH4.5. Suitable solubilities are described in WO96/14454. Usually the rate of dissolution is at least 10 or 20 nm per day in that saline. The fibres preferably have sintering temperature above 800° C., more preferably above 1,000° C. The melt preferably has a viscosity at fibre forming temperature of 5 to 100 poise, preferably 10 to 70 poise at 1,400° C. Additional embodiments of this example may be found in WO 99/28252 (which is incorporated herein by reference).

Preferably, the mineral melt in this particular example has a viscosity in the range 10 to 30 poises at 1400° C., more preferably in the range 20 to 25 poises. An advantage of choosing these viscosities is that the resulting MMVF have a smaller diameter than if the viscosity of the melt were higher. Further, it is possible to use the melt at a lower temperature in order to achieve the required operating viscosities. This saves energy, as it is possible to use the melt at a lower temperature. It also reduces the wear on rotors used to produce fibers, as a lower temperature melt causes less wear. Further details of this example mineral melt may be found in WO 2015/055758 (which is incorporated herein by reference). The viscosity of the melt may be determined in accordance with ASTM C 965-96.

A cupola furnace useful in the process of the invention may comprise the components and zones described above, in addition to the following. Usually the mineral melt forms a pool in the hot zone, from which it is run off via a siphon to a fibre forming process. The mineral melt may be run from the base of the cupola furnace into another chamber where it collects as a pool and from which it is run off to a fibre-forming process.

The raw materials may be in the form of briquettes. Briquettes are made in a known manner by moulding a mix of the desired particulate materials and a binder into the desired briquette shape and curing the binder.

The binder may be a hydraulic binder, i.e. one that is activated by water, for instance Portland cement. Other hydraulic binders can be used as partial or complete replacement for the cement and examples include lime, blast furnace slag powder, and certain other slags, and even cement kiln dust and ground MMVF shot (JP-A-51075711, U.S. Pat. Nos. 4,662,941 and 4,724,295 each of which is are incorporated herein by reference). Alternative binders include clay. The briquettes may also be formed with an organic binder such as molasses, for instance as described in WO 95/34514 (which is included herein by reference). Such briquettes may be described as formstones.

In a third aspect of the invention, there is provided a cupola furnace for the preparation of a melt according to process of the first aspect of the invention. The cupola furnace may comprise the features herein described before.

In a fourth aspect of the invention, there is provided the use of a plasma torch in a cupola furnace to reduce the amount of NO$_x$, CO, CO$_2$, and/or hydrogen in the off-gas, in comparison with a corresponding process in which the plasma torch carrier gas is air or oxygen. Preferably, the use is to reduce the amount of NO$_x$, and/or hydrogen in the off-gas.

The MMVF may be formed as a bonded web comprising the MMVF as described above, or MMVF made according to the process described above, or MMVF made using the apparatus described above, and a cured binder composition.

The melt formed according to the process of the invention, and man-made fibres (preferably MMVF) made therefore, may be suitable for use in a range of products, such as insulating elements (both thermal and/or acoustic), and fire insulation elements.

The invention will be described in further detail with reference to the drawing which shows a furnace for carrying out the process according to the invention.

The drawing in FIG. 1 shows a cupola furnace 1 having a feed hopper 2 which communicates with a vessel 3 having a bottom that is constituted by an axially displaceable cone 4. Below the vessel 3 there is a melting chamber which is enclosed by a water-cooled jacket 5. The cupola furnace 1 comprises at its lower end a plane furnace bottom 6 and in a suitable distance above the bottom 6 there is provided a melt outlet 7. A number of plasma torches 8 are built into the furnace wall some distance above the level wherein the melt outlet 7 is placed. At a higher level there is provided an annular air inlet pipe 9 which communicates with a number of tuyeres 10. The cupola furnace 1 has an inner lining at the hot zone, which is made from bricks. The lining covers the furnace bottom 6 and the inner furnace wall to a height at least up to the tuyeres 10.

The solid materials i.e. the raw materials, having a composition corresponding to that of the desired melt are fed into the melting chamber through the hopper 2 and the vessel 3, the dosage being effected by suitable adjustment of the cone 4. Carbonaceous material, such as coke, may be added with the solid materials, as required.

The upper portion of the melting chamber acts as preheating zone as the materials are heated by the ascending smoke gases. From the preheating zone the materials descend down through the oxidation zone of the furnace, the lower limit of which is located at the level wherein air is introduced through the tuyeres Coke is combusted in the oxidation zone so as form $CO_2$. The temperature in the oxidation zone is kept at such a level that the temperature of the portion of the preheating zone located immediately above the upper end of the oxidation zone does not exceed 1000° C. so as to eliminate or considerably reduce a reaction between the $CO_2$ formed in the oxidation zone and carbon so as to form CO. The actual melting is effected in the portion of the melting chamber which is located below the oxidation zone and wherein strong heat is introduced by means of the plasma torches 8. The melt formed descends down towards the bottom of the furnace and the melt is discharged through the melt outlet 7.

Examples

The invention is further illustrated by the following non-limiting examples.

A melt is formed in a plasma fired cupola furnace, in which the plasma torches are provided with either air or $N_2$ as the carrier gas. The table below shows the cupola conditions for each type of carrier gas, together with the composition of the exhaust gas (in % by volume or ppm). When using air as carrier gas it is necessary to mitigate NOx formation which is most obviously done by adding liquid propane gas (LPG) through the plasma torch together with the carrier gas. This explains the differences in power and carrier gas flow at the plasma torch. The different amounts of air to the tuyere are caused by these different operating conditions.

| Plasma fired cupola | | |
|---|---|---|
| | air as carrier gas | $N_2$ as carrier gas |
| Plasma torch | | |
| power, kwh/(ton raw material) | 790 | 870 |
| carrier gas flow, Nm³/(ton raw material) | 165 | 180 |
| enthalpy, kwh/Nm³ | 4.8 | 4.8 |
| Liquid propane gas (LPG) for mitigating NOx, Nm³/(ton raw material) | 6.9 | 0 |
| Coke | | |
| kwh/(ton raw material) | 210 | 210 |
| Air to tuyere, Nm3/(ton raw material) | 64 | 135 |
| Off gas compositions | | |
| CO % | 3.1 | 1.6 |
| $CO_2$ % | 13.6 | 6.2 |
| $H_2$ % | 12.5 | <0.1 |
| $O_2$ % | 4.6 | 3.5 |
| NOx, ppm | 3100 | 250 |

The data show that the amount of each component in the off gas listed is significantly reduced when $N_2$ is used as the carrier gas. In particular, there is a substantial reduction in the amount of $NO_x$ and $H_2$ present in the off-gas. The amount of $H_2$ produced when $N_2$ is used as the carrier gas was below the detection limit of the equipment.

The invention claimed is:

1. A process for preparing a mineral melt in a cupola furnace, said process comprising supplying mineral material to the cupola furnace, and providing heating energy to the cupola furnace, said cupola furnace having a base, such that said mineral material is melted to form a mineral melt that collects in the base of the cupola furnace, and wherein the process produces off-gas, wherein:

the cupola furnace comprises at least two temperature zones, including a hot zone at the base of the cupola furnace and an oxidation zone above the hot zone;

(i) the cupola furnace is equipped with at least one tuyere providing a source of oxygen in the oxidation zone;

(ii) the cupola furnace comprises at least one plasma torch that uses as carrier gas nitrogen, carbon monoxide, carbon dioxide, or a mixture thereof, and provides plasma heating in the hot zone;

(iii) greater than 50% of the heating energy provided to the cupola furnace is provided by the at least one plasma torch;

(iv) the temperature in the oxidation zone is below 1,400° C.;

(v) the temperature in the hot zone is greater than the temperature in the oxidation zone;

(vi) water is substantially excluded from any zone of the cupola furnace where the temperature is above 750° C.

2. The process as claimed in claim 1, wherein greater than 60% of the heating energy provided to the cupola furnace is provided by the at least one plasma torch.

3. The process as claimed in claim 1, wherein the temperature in the oxidation zone is below 1,300° C.

4. The process as claimed in claim 1, wherein heating is provided in the hot zone solely by the at least one plasma torch.

5. The process as claimed claim 1, wherein the temperature in the hot zone is above 800° C.

6. The process as claimed in claim 1, wherein the carrier gas enthalpy is from 2.0 to 6.0 kWh/Nm³.

7. The process as claimed in claim 1, wherein the melt has the following composition expressed as oxides, by weight %:

| | |
|---|---|
| $SiO_2$ | 35-50 |
| $Al_2O_3$ | 12-30 |
| $TiO_2$ | up to 2 |
| $Fe_2O_3$ | 2-12 |
| CaO | 5-30 |
| MgO | 0-15 |
| $Na_2O$ | 0-15 |
| $K_2O$ | 0-15 |
| $P_2O_5$ | 0-3 |
| MnO | 0-3 |
| $B_2O_3$ | 0-3. |

8. The process as claimed in claim 1, wherein the cupola furnace produces off-gas comprising $NO_x$ in an amount of less than 400 ppm.

9. The process as claimed in claim 1, wherein the carrier gas is nitrogen.

10. The process as claimed in claim 1, wherein the carrier gas comprises at least one component of the off-gas.

11. The process as claimed in claim 10, wherein the at least one component of the off-gas undergoes off-gas cleaning prior to its use as carrier gas.

12. The process as claimed in claim 10, wherein the carrier gas consists of the at least one component of the off-gas.

13. The process as claimed in claim 1, wherein greater than 70% the heating energy provided to the cupola furnace is provided by the at least one plasma torch.

14. The process as claimed in claim 1, wherein the temperature in the oxidation zone is below 1,200° C.

15. The process as claimed claim 1, wherein the temperature in the hot zone is above 900° C.

16. The process as claimed in claim 1, wherein the carrier gas enthalpy is from 3.0 to 5.0 kWh/Nm³.

17. The process as claimed in claim 1, wherein the cupola furnace produces off-gas comprising hydrogen in an amount of less than 20,000 ppm.

18. A process for manufacturing man-made vitreous fibre (MMVF) comprising the steps of:

(i) forming a melt using a process as defined in claim 1;

(ii) fiberizing the melt by means of an internal or external spinning process; and (iii) collecting the formed fibres.

* * * * *